Nov. 7, 1967 SHINZO KIMURA ETAL 3,350,997
ELECTRIC TOASTER
Filed Dec. 17, 1965 7 Sheets-Sheet 1

INVENTORS
Shinzo Kimura
Hiroo Hosono
BY Stevens, Davis, Miller & Mosher
ATTORNEYS

Nov. 7, 1967  SHINZO KIMURA ET AL  3,350,997
ELECTRIC TOASTER

Filed Dec. 17, 1965

INVENTORS
Shinzo Kimura
Hiroo Hosono
BY Stevens, Davis, Miller & Mosher
ATTORNEYS

PRIOR ART FIG. 10

- Compensatory thermo element 67
- Primary thermo element 66

INVENTORS
Shinzo Kimura
Hiroo Hosono

ATTORNEYS

FIG. 13

United States Patent Office 3,350,997
Patented Nov. 7, 1967

3,350,997
ELECTRIC TOASTER
Shinzo Kimura, Fuse-shi, and Hiroo Hosono, Osaka, Japan, assignors to Matsushita Electric Industrial Co., Ltd., Osaka, Japan, a corporation of Japan
Filed Dec. 17, 1965, Ser. No. 514,542
Claims priority, application Japan, Dec. 21, 1964, 39/72,757; Mar. 30, 1965, 40/19,334; Nov. 4, 1965, 40/89,986
6 Claims. (Cl. 99—329)

ABSTRACT OF THE DISCLOSURE

An automatic toaster having a thermostat for the continuous control of toasting conditions, the thermostat consisting of a primary bimetal element for detecting the temperature in the vicinity of the bread surface and a compensatory bimetal element disposed immediately above the vertically arranged bread toasting heater with a heat-shielding cover interposed therebetween. By the provision of the thermostat, the toaster shows an improved continuous toasting characteristic, makes a satisfactory toasting operation while following up any variation in supply voltage, has a shortened waiting time between successive toasting stages, and has a simplified structure.

This invention relates to electric toasters and is intended to provide a novel and improved electric toaster adapted to control the toasting process in an automatic fashion particularly in accordance with the surface temperature of the bread being toasted.

In designing a toaster, a first requisite is to enable it to toast bread slices successively to substantially the same brown color in accordance with the user's taste. Various attempts have been made to meet this requirement. Among them, the most recommendable are those intended to control the toasting temperature particularly in the vicinity of the surface of the bread slice being toasted. Various proposals have been made to attain this objective in respective ways but many of them have not been fully satisfactory. One of the methods of controlling a succession of toasting cycles in accordance with the temperature of the bread surface and which has previously been regarded as most effective employs a temperature regulator which is arranged centrally of the toaster between the bread being toasted and the adjacent heater means and which includes a primary bimetal element operable in response to the temperature of the adjacent bread surface and an auxiliary bimetal element integral with said primary element forming together with the latter a U-shaped configuration and intended to compensate for any excess of heat given to the primary member. This method, however, involves a deficiency that the auxiliary bimetal is apt to be influenced by radiation from the heater means making the temperature characteristic of the toaster extremely unstable and hence with this type of toaster it has been difficult to toast with any substantial uniformity particularly when bread slices are toasted in succession. Moreover, because of its location the auxiliary bimetal member cools down rapidly making it impossible to start the next toasting cycle immediately. This is disadvantageous particularly when it is desired to toast bread slices successively. Another disadvantage of this type of toaster is that bread slices come out in colors widely differing from each other even when toasted successively particularly in the event that the suply voltage to the toaster or the room temperature is varied since the primary thermometer element intended to sense the surface temperature of the bread slice being toasted is really so located as to operate at a relatively low temperature and tends to undergo the influence of the stream of cold air entering the toaster casing.

The present invention is intended to overcome these difficulties encountered with previous control devices and has for its object to provide in combination with an electric toaster an automatic thermostat device which enables the toaster to toast bread slices in any succession or at random intervals in such a manner that they always come out in a uniform brown color irrespective of variations in supply voltage, room temperature or other toasting conditions. To attain this objective the present invention proposes to employ a primary bimetal element arranged in the vicinity of the surface of the top portion of the bread slice being toasted to operate primarily in response to the temperature of the bread surface and to the heat of fluid stream rising therefrom and a compensatory bimetal member arranged immediately over the heater means of the toaster through the intermediary of a heat-shielding cover to operate primarily in response to the temperature of the atmosphere in the toaster casing.

Another object of the invention is to provide a thermostat device of the character described in which the compensatory bimetal member is enclosed by cover or like means so as to prevent its cooling in order to reduce the time interval required between two consecutive toasting cycles when bread slices are toasted successively, that is, the length of time to be given after a bread slice has been toasted and before insertion of the next slice.

A further object of the present invention is to provide a thermostat device of the character described which is not deficient from the operational viewpoint being constructed so as to ensure that, even if the operator's hand or other object be inserted through the toaster openings for changing bread slices it never comes into contact with the device.

Yet another object of the invention is to minimize the variation in extent to which bread slices are toasted which is inevitable in case the slices have different thicknesses or are of different kinds of bread. To attain this objective, the thermostat which responds to both the temperature of the bread surface and the heat of steam rising therefrom should be designed so as to minimize the effect of any variation in distance between the bread slice and the adjacent bimetal strip.

Another object of the present invention is to provide a thermostat device of the character described which does not form its shadow on the bread slice being toasted, is simple in construction, inexpensive and is reliable in operation.

A further object of the present invention is to provide a thermostat device of the character described in which the main and compensatory control elements are formed of the same or different bimetal materials and which can be applied to any existing forms of toaster without necessitating any substantial change in their specifications to function with extreme stability.

An additional object of the invention is to provide a thermostat device of the character described which has uniform and stable operation characterictics with any interference between the primary and compensatory thermomotive elements eliminated by flanging or otherwise working the joint section interconnecting the elements to impart a nondeflective character to the section in case the elements are formed integral of the same bimetal material or by interconnecting the elements by an appropriate nondeflective member in case they are formed separate of different bimetal materials.

The foregoing and other objects, features and advantages of the present invention will become apparent from the following detailed description when taken in conjunction with the accompanying drawings, in which:

FIG. 5 is a fragmentary perspective view showing the arrangement of the inventive device in further detail;

FIGS. 6a and 6b are perspective views of further forms of thermostatic device embodying the present invention; FIG. 6a illustrates a device including members formed integral of the same bimetal material and FIG. 6b illustrates another device including two bimetal elements interconnected by a separate piece;

Description will now be made on the construction and arrangement of the illustrated embodiments of the present invention. Though these embodiments are shown and described as applied to a toaster of the type having two cavities to receive bread slices, it is to be understood that the present invention can be applied to toasters of any configuration.

Figure 1:
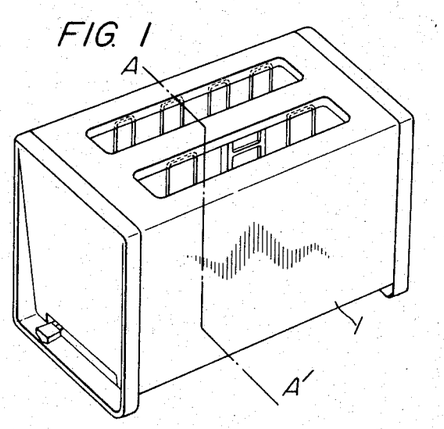
FIG. 1 is a perspective view illustrating in reduced scale an entire toaster unit incorporating a temperature control device according to the present invention.
Figure 2:
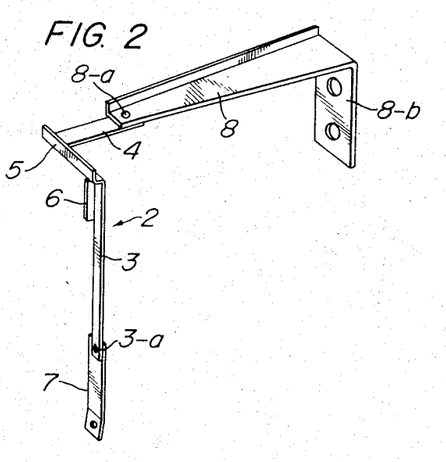
FIG. 2 is an enlarged perspective view of the thermostat device embodying the present invention.

In FIG. 1, reference numeral 1 generally indicates a toaster having two bread-receiving cavities and having incorporated therein a temperature control device shown in FIG. 2.

Referring to FIG. 2, the thermostat device includes a thermostatic element 2 made of a high-temperature bimetal material of the thickness, in this instance, of the order of 0.75 mm. The member includes primary thermomotive bimetal element 3 operable in response to the temperature in the vicinity of the bread surface and a compensating thermomotive element 4 secondarily operable in response to the surrounding temperature atmosphere to compensate the deflection of the primary thermomotive bimetal element. The two control strips are made integral with each other by bending a U-shaped bimetal sheet so that its two legs extend at right angles to each other with a flanged portion 5 interposed therebetween. An additional flange 6 is formed to prevent deflection of the top portion of the primary thermomotive element which is adjacent to the junction between the primary and compensatory element. As illustrated, the primary thermomotive bimetal element 3 is narrow in width and elongated relative to the compensatory element 4 and, in this instance, approximately 2.5 mm. wide and length of 40 mm. The compensatory thermomotive bimetal element 4 most preferably has a width of approximately 4 mm. and a length of approximately 12 mm., which approximates one-third of the length of the main bimetal member. The dimensions of the bimetal members may vary to a more or less extent depending upon the temperature of the heating means, the power supply to the toaster and the manner in which the compensatory thermomotive bimetal element is mounted.

An engaging metal strip 7 is secured to the movable deflecting end of the primary thermomotive bimetal element 3 as at 3a by spot welding or other suitable means for engagement with a switch mechanism described hereinafter. The thermomotive element 3–4 thus formed is secured to a support bracket 8 as by a spot weld 8a to form a thermostat unit, which is mounted in the toaster casing by way of the support bracket 8. The support bracket 8 is preferably made of a stainless steel or other material having a relatively low heat conductivity.

The manner in which the thermostat unit is arranged in the toaster and its construction will next be described in detail with reference to FIGS. 3, 4 and 5.

Figure 3:
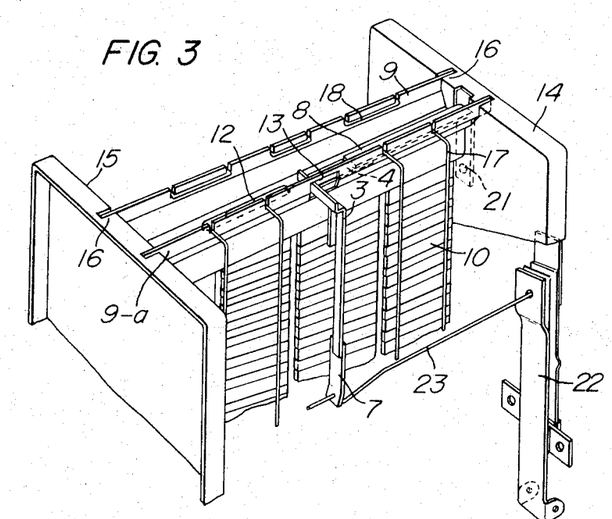
FIG. 3 is a fragmentary perspective view of the toaster showing the inventive thermostat device incorporated therein.
Figure 4:
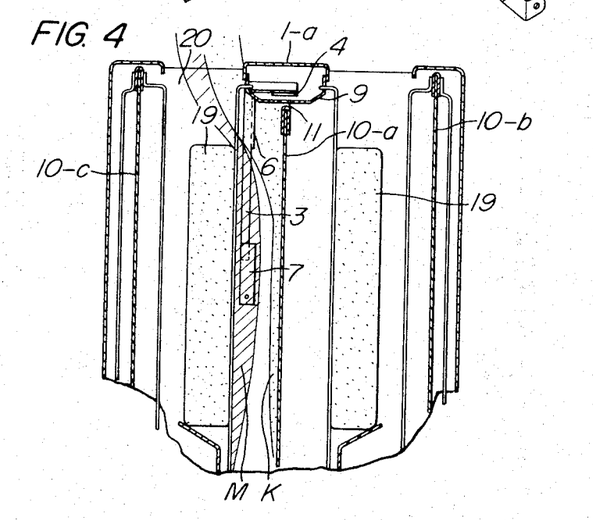
FIG. 4 is a fragmentary sectional elevation of the toaster taken along the line A–A' in FIG. 1 and showing the manner in which the inventive thermostatic device is arranged in more detail.

Referring to FIGS. 3 and 4, a heat-shielding cover 9 is arranged immediately over the central heating unit 10a arranged in the toaster casing and has a U-shaped cross section to receive the above-described compensatory thermomotive bimetal element 4 in the space defined between the heat-shielding cover 9 and a portion 1a of the toaster body cover. It may sometimes happen that a toaster user lifts the toaster by gripping the toaster body cover portion 1a by hand. The provision of the body cover portion 1a and a guard 17, described later, prevents the primary contact strip 3 from being engaged by the hand in such a situation. The heat-shielding cover 9 is made of sheet metal the surface of which is treated by glossy plating or the like and serves to shield the compensatory thermomotive bimetal element from radiant heat from the heater and is formed of a metal material lustered by plating or other surface treatment. Elongated apertures 11 and 12 are formed in the heat-shielding cover 9 immediately above the heater unit 10a as by punching. Also, formed in one side 9a of the heat-shielding cover centrally thereof is a slotted aperture 13 through which thermostat unit 2 extends. The heat-shielding cover 9 is fixed at its opposite ends as by bent means to respective end plates 14 and 15 which define the opposite ends of the bread-receiving cavities. Also, the opposite side walls of the heat-shielding cover 9 are slitted to fixedly engage guard rods 17 and 18, which serve to protect the heater element.

As illustrated, the compensatory thermomotive bimetal element is arranged immediately above the central heater unit 10a in parallel to and midway of the major surface of the heat-shielding cover 9 so that the primary thermomotive bimetal element 3 is disposed in substantially the same plane as the adjacent guard rods 17 with the plane of the primary thermomotive element extending at right angles to both heater element 10 and adjacent bread slice 19. In addition, the movable or deflecting portion 3 of the primary thermobimetal element is positioned in the bread-receiving cavity 20 relatively closedly to its top, as illustrated. It will be understood that such arrangement of the thermostat unit does not form any shadow on the surface of the bread slice being toasted because of the limited extent of the primary thermobimetal element and owing to the fluid stream rising along the latter. The bimetal element is fixed in position by securing the base portion 8b of the support bracket 8 to the top portion of one of the end plates 14 defining the bread-receiving cavities 20 as by screw means 21. As shown in FIG. 3, the thermostat unit 2 is connected to a switching mechanism 22 by means of a connecting link bar 23 for the purpose of controlling the heater circuit of the toaster. The connecting link 23 takes the form of a metal rod connected at one end to the engaging strip 7 secured to the primary thermomotive bimetal element 3. The switch 22 is electrically connected in series with the heater elements 10 and acts to open the heater circuit when actuated by the bimetal unit through the connecting link 23.

A guard 24 (FIG. 5) formed of a woven mesh of metal rods or a perforated metal sheet is arranged to prevent any disturbance to the operation points of the control device which may occur when the top portion of the primary thermomotive element is engaged, for example, by the hand carrying bread slices to or from the bread-receiving cavities. The guard is fixed at the top to the adjacent side of the heat-shielding cover 9 and at the bottom to a portion of the cavity casing. Reflector plates, for example, of aluminum, are arranged in spaced parallel relation to the heater elements 10b and 10c, respectively, though the reflectors form no part of the present invention.

Figures 5, 6A, 6B:
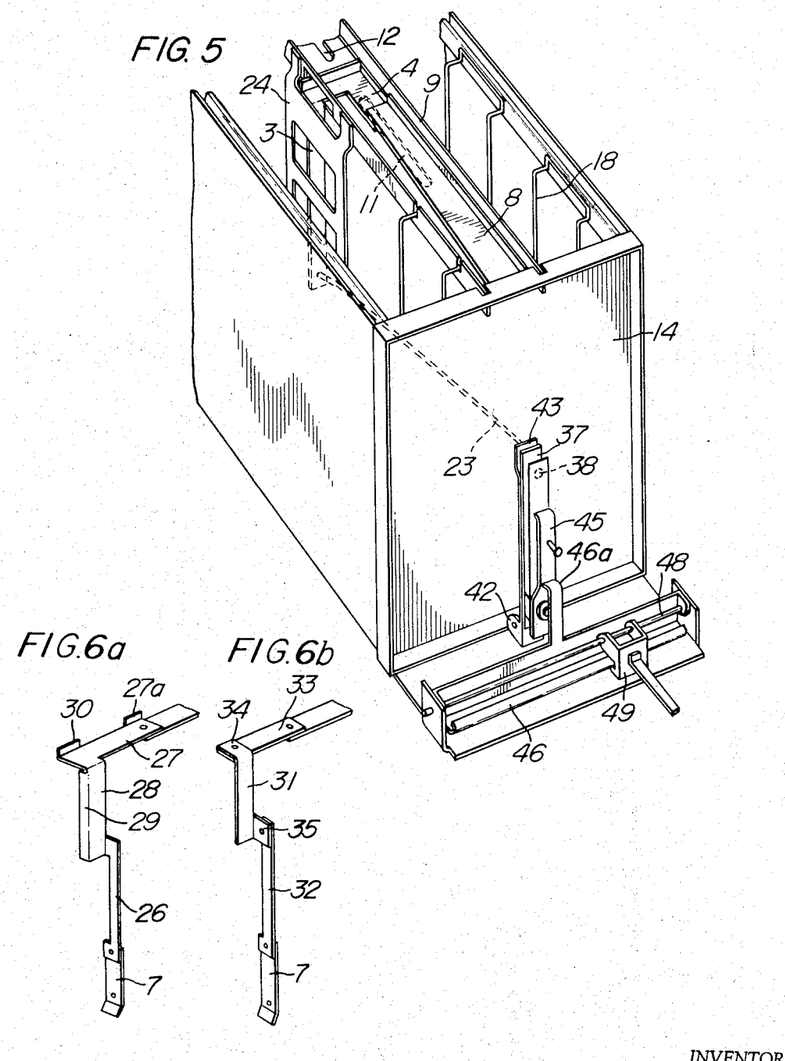
Figure 7:
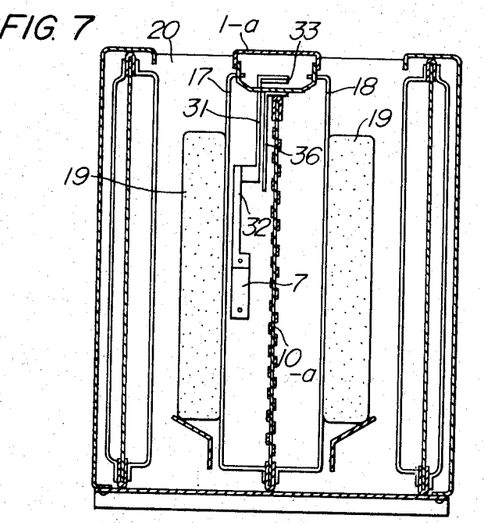
FIG. 7 is a sectional elevation of a toaster including another form of inventive thermostatic device.

Reference will next be made to FIGS. 6a and 6b, which illustrate modified forms of thermostat unit member according to the present invention. These modifications are intended to prevent the danger of the thermostatic bimetal element being engaged by the hand or other object entering the bread-receiving cavity from above, as described previously. The bimetal element shown in FIG. 6a is formed of a single bimetal sheet and functions in quite the same manner as the member 2 shown in FIG. 2, that is, it operates in response to the temperature in the vicinity of the bread surface. The bimetal element is formed by punching a bimetal sheet and bending the sheet punched so as to form a leg 26 operable in response to the temperature of the atmosphere in the bread-receiving cavity and another leg 27 operable to compensate the operation of said leg 26. The legs serving as primary and compensatory bimetal element, respectively, are connected by a connecting portion 28, which is positioned in a plane closely spaced from the plane of the central heating unit, as shown in FIG. 7, so as not to be directly touched by the hand entering the bread-receiving cavity. The connecting portion 28 is flanged so as not to be deflected, as indicated by 29. The compensatory thermomotive bimetal element 27 is also flanged as at 30 to prevent its local deflection. The remaining formation of the bimetal element is similar to the one shown in FIG. 2.

The actual position and length of the compensatory bimetal element 27, depending upon the manner in which it is secured to the support bracket, have a considerable effect upon operation of the primary thermomotive bimetal element 26 so that it is desirable to form a flange 27a on the compensatory bimetal element for alignment when it is joined to the support bracket as by spot welding.

Reference will next be made to FIG. 6b, which illustrates a modification of the bimetal element shown in FIG. 6a. This modification is intended to reduce the manufacturing cost of such unit, including a separate member 31 used instead of the connecting portion 28 to interconnect a primary and a compensatory bimetal element 32 and 33 to form an integral unit. The primary and compensatory bimetal element 32 and 33 are formed of a metallic material having a relatively low expansion coefficient and connected to the opposite end portions 35 and 34 of the member 31 as by spot welding so as to extend at right angles to each other.

Another example of this modified form of bimetal unit is arranged in the toaster shown in FIG. 7 in the same manner as described hereinbefore in connection with FIG. 4. As observed, a predetermined distance is maintained between the plane of the guard 17 and the connecting member 31 of the bimetal element so that even if the fingers gripping the top portion 1a of the toaster casing to carry the toaster are partially inserted in the bread-receiving cavities they are safely kept out of contact with the connecting member 31. A heat shielding plate 36 is employed in this arrangement to prevent the connecting member 31 or 28, which is positioned close to the heater units 10-a, from being excessively heated by radiation therefrom. This arrangement of the bimetal element is otherwise similar to that of the unit 2 described hereinbefore.

Figure 8:
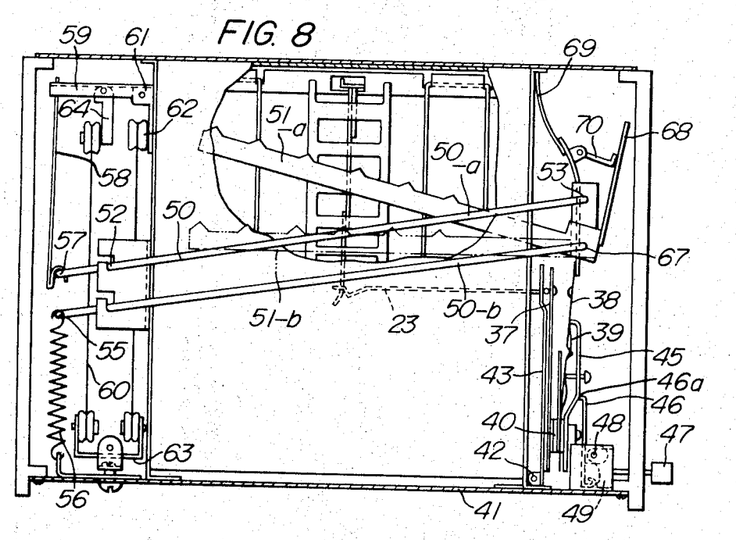
FIG. 8 is an explanatory elevational view, partly cutaway, of an automatic toaster including means for automatically moving bread slices between their toasting and nontoasting positions and a thermostat device according to the present invention.

Next, the construction and operation of an automatic toaster having incorporated therein a thermostat device according to the present invention with reference to FIG. 8. The toaster illustrated in FIG. 8 includes such a switch mechanism as indicated at 22 in FIG. 3, which includes two contact strips 37 and 38. One of the contact strips 38 takes the form of a toggle spring as indicated by numeral 39. The contact strips 37 and 38 are clamped together at the bottom with an insulator 40, for example, of mcia interposed therebetween, and are secured by screw means to a mounting plate 43 pivoted at 42 to the base 41 of the toaster. A stop member 45 is provided to limit the movement of the toggle spring or contact strip 38 when it is thrown back. Held at one end in engagement with the stop member 45 is a cam plate 46 which is pivoted at 48 for pivotal movement with right and left sliding movement of a button 47 relative to the toaster casing. The cam plate 46 carries at the other end of cam surface which is in sliding engagement with a slider 49 integral with the button 47. With this arrangement, when the button 47 is moved right and left, the switch assembly is rotated about the axis 42 so as to adjust the operating position of the switch assembly relative to the thermostat unit 2. By such adjustment, the distance between the contact strip 37 and the adjacent end of the push rod or connecting link 23 is varied to vary the time of deflection of the element and hence the toasted color of bread slices.

To help understanding the operation of the thermostat device of the present invention, brief description will next be made on one form of automatic bread lifter device designed to move bread slices from nontoasting to toasting position with reference to FIG. 8, though the device forms no part of the invention. This device includes a pair of metal crank levers 50a and 50b provided for vertically moving bread supports 51a and 51b which are pivoted to the pair of crank levers at one end thereof. A balance spring 56 is engaged with the other end of one of the crank levers 50b as indicated at 55 in order to counterbalance the weight of the crank levers and bread supports 51a, 51b. A leaf spring 58 is associated at one end with the other crank lever 50a at its adjacent end 57 and is connected at the other end with an amplifier lever arm, 59 which carries a metal expansion wire 60. When electrically energized, the expansion wire 60 is extended to allow the amplifier lever arm 59 to pivot about its axis 61 so that the crank levers 50a, 50b are rotated under gravity in a clockwise direction as viewed in FIG. 8 to move the bread slices resting on the bread supports 51a, 51b from nontoasting to toasting position. In the illustrated example, the metal expansion wire 60 is fixed at one end to a fixed insulator 62 and at the other end to said amplifier lever 59 by means of a hook 64 with a rockable lever 63 disposed intermediate the ends of the wire, as shown. It will be apparent that various other forms of bread lifter may be employed in association with the thermostat device of the present invention to serve the purpose of automatically moving bread slices in response to the operation of the latter.

Figure 10:
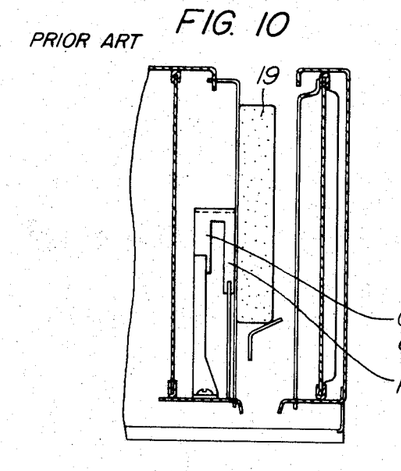
FIG. 10 is a sectional elevation illustrating the arrangement of a conventional type of thermostatic device.

FIG. 10 illustrates one conventional form of bimetal control operable in response to the temperature of the bread surface. The bimetal element 65 of this thermomotive unit is inverted U-shaped including a primary thermomotive bimetal section 66 disposed adjacent to the bread surface and a compensatory thermomotive bimetal element 67 more or less spaced from the primary thermomotive bimetal element 66. As shown, the bimetal element 65 is positioned as a whole slightly below the center of the bread slice placed in the cavity with the two bimetal elements 66 and 67 lying in a plane which extends at right angles to the bread surface.

Having described the construction and arrangement of various forms of temperature control device according to the present invention and of one conventional device, description will next be made specifically on these forms of thermostat. In the following description it is assumed that the inventive temperature control is applied to a toaster including heater means rated at 115 v. and 1000 w. or thereabouts.

Description will first be made on the operation of the bimetal element comprising the inventive thermostat device with reference to FIGS. 9a, 9b and 9c and FIG. 11.

Figure 9A:
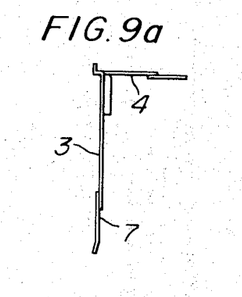
FIGS. 9a, 9b and 9c are enlarged views illustrating the inventive thermostatic device in its different stages of operation.
Figure 9B:
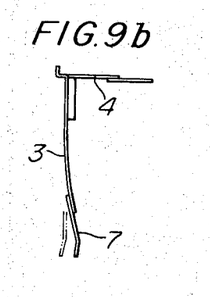
Figure 9C:
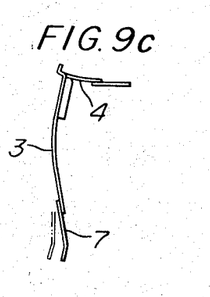
Figure 11:
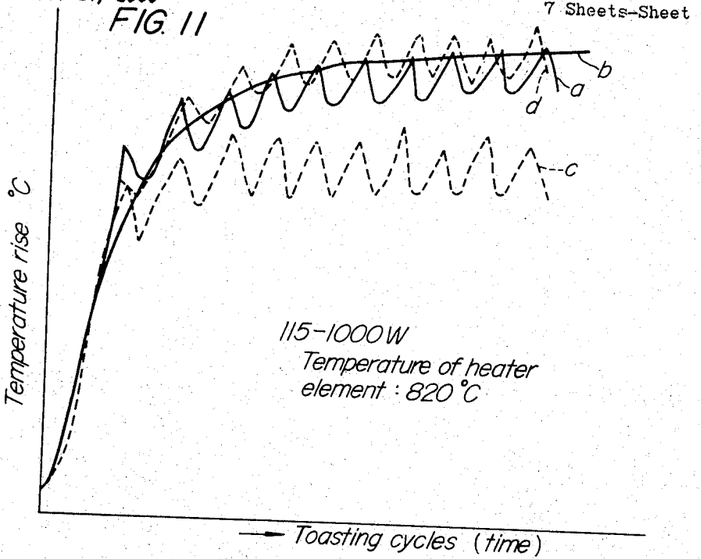
FIG. 11 is a graphical representation of the operating-temperature versus time relation of the thermostatic device in comparison with that of the conventional one with the curves $a$ and $b$ illustrating the temperature characteristics of the main and compensatory bimetal element of the inventive device and the curves $c$ and $d$ illustrating those of the primary and compensatory thermomotive element of the conventional arrangement.

As the toasting temperature rises as shown by the temperature curve a in FIG. 11, the primary thermomotive bimetal control member 3, which is arranged adjacent to a vertically positioned bread slice at a level more or less higher than its center, primarily senses the temperature in the vicinity of the bread surface and that of the rising stream of fluid caused by vaporization of the water contained in the bread and thus is deflected to the right as shown in FIG. 9b to push the contact 37 of the switch mechanism by way of the push rod 23 (FIG. 8). On this occasion, the compensatory thermomotive bimetal element 4, which is arranged immediately above the heater with the heat-shielding cover 9 interposed therebetween, is apparently heated in association with the temperature rise of the surface portion of the bread slice and thus is deflected upwardly as shown in FIG. 9c. As the result, the deflection of the bottom end of the primary thermomotive bimetal element is more or less reduced. Subsequently, when the differential deflection between the primary and compensatory bimetal control element reaches a set point of operation, the contact strips normally held in contact with each other are separated to terminate the first toasting cycle.

Assuming that it is desired to toast bread slices successively, when the next bread slice is placed in the cavity after a certain period of time, the thermostat device is reset as a joint effect of the insertion of the cold bread slice and the cooling off of the primary thermomotive bimetal control element previously occurring as the result of deenergization of the heating means at the end of the first toasting cycle and immediately starts to operate responding to the rise of the temperature of the newly placed bread slice. On this occasion, the temperature of the primary thermomotive element is first lowered to a certain extent and then starts to rise as illustrated by the curve a in FIG. 11 whereas the temperature of the compensatory element generally continues to rise slowly without any substantial drop, as illustrated by the curve b in FIG. 11, since this member is partially enclosed by the heat-shielding cover. Also, on this occasion, any limited restoration of the compensatory thermomotive bimetal element, when it is cooled to a more or less extent acts in a direction to cause the primary thermomotive element to actuate the switch mechanism into closed position. With previous control devices, in cases where the toaster is loaded with bread slices immediately after the end of a toasting cycle, the heater switch is once closed but is shortly opened because of the cooling of the compensatory thermomotive element to the disadvantage that bread slices cannot be toasted in any consecutive manner. This difficulty is completely overcome by use of the inventive temperature control device in which the compensatory member is not cooled to any substantial extent owing to the heat-accumulating effect of the arrangement including the heat-shielding cover. In this connection, if the heat-shielding cover be made in an entirely closed configuration, the temperature rise of the compensatory thermomotive element during the first toasting cycle will be hindered so that its correlation with the rise in temperature of the primary thermomotive element is disturbed. This will reduce the length of toasting time particularly in the first toasting cycle and thus cause undertoasting. To avoid this problem, it is desirable to form elongated apertures 11 and 12 in the heat-shielding cover in a size not to hinder the cooling of the control member. The apertures are intended to direct the convection heat from the heater into the heat-shielding cover during the initial stage of the toasting cycle thereby to promote the rise in temperature of the compensatory thermomotive element so that the temperature of the latter may rise at substantially the same rate as the primary thermomotive element, as shown in FIG. 11. With this arrangement, the temperature correlation between the primary and compensatory element obtained when the toasting cycle is repeated will be satisfactorily proportional. Two of such elongated apertures in the heat-shielding cover will suffice each formed in a width of about 2 mm. and a length of about 30 mm. With conventional thermomotive control devices, since the primary and compensatory thermomotive bimetal control element are arranged close to each other so that the compensatory thermomotive bimetal is directly subjected to the radiant heat from the adjacent heater unit and is rapidly cooled when bread slices are newly inserted at the end of each toasting cycle, as shown by the curve d in FIG. 11, the time length of each toasting cycle when bread slices are toasted consecutively is necessarily extended and at the same time heavy variations are caused in operation of the toaster.

According to the present invention, the compensatory thermomotive element is operable to cause a temperature difference required for the primary thermomotive element to repeat its controlling function. In general, the thermostat device is required in performing a succession of toasting cycles to meet the following conditions. First, any desired number of bread slices should be toasted to the same brown color of the user's choice. Secondly, they should be toasted to the same color even when the supply voltage to the toaster is varied. Thirdly, the same toasted color of the user's choice should be obtained at all times to whatever extent the room temperature may vary. Fourthly, the control device is resettable to start the next toasting cycle with satisfactory results even when new bread slices are charged immediately after toasted ones have been taken out. And, finally, bread slices should be toasted to the same finish as desired even if they are toasted at random intervals or they are of different quality.

The inventive thermostat device operates as follows to meet these different conditions. The primary thermomotive bimetal element of the inventive thermostat device is positioned relative to the bread surface at a level higher than the conventional one, which has been arranged opposite to the center of the bread surface, as described hereinbefore and, therefore, is operable at higher temperatures under the influence of heat convection, as observed from curves c and d in FIG. 11. Also, the operation of the primary thermomotive element is thermally stable involving no variation previously caused by a stream of cold air from the bottom of the adjacent bread-receiving cavity. The manner in which the primary thermomotive bimetal element receives heat from bread can be analyzed as follows. This heat is derivable from the atmosphere covering the bread surface, the flow of steam vapor emitted by the bread being heated, radiation from the heater, etc. Among others, the primary thermomotive bimetal element of the inventive control device is subjected to the full effect of the steam flow, which is particularly important to the stability in toasting operation. This is very effective to give satisfactory results when slices of different kinds of bread are toasted and gives a highly improved operation sensitivity compared to that conventionally obtained.

Next, the operation of the compensatory thermomotive bimetal element to compensate the operation of the primary thermomotive bimetal element will be analyzed for a succession of toasting cycles.

As described hereinbefore, the compensatory thermomotive element is horizontally arranged immediately above the heater unit with a lustered metal heat-shielding cover interposed therebetween. Because of this arrangement, the element is not subjected to any undesirable discontinuous heating and cooling effects such as of the radiant heat of the heater and heat absorption of cold bread. In thermostat devices of the type designed to sense the temperature of the bread surface, the compensatory thermomotive element is required to met the condition that, in case bread slices are toasted successively, it operates to remove any excess of heat imparted to the primary thermomotive element therefrom or any excessive deflection thereof. The compensatory thermomotive element of the inventive control device operates fully satisfactorily to this requirement, as will be described below. As illustrated by the curves $a$ and $b$ in FIG. 11, the temperatures of the primary and compensatory thermomotive element of the inventive device vary perfectly in proportion to each other so that any excessively high temperature of the primary thermomotive element can be compensated for by the compensatory element to ensure that the switch assembly is actuated at all times at a predetermined operation point. Also, the temperature curve $b$ for the compensatory element includes no rise or fall otherwise occurring after each toasting cycle has been completed, indicating that the element continues to maintain the operation of the primary thermomotive element at all times within an appropriate operational range. In contrast to this, the compensatory element of any conventional system has been exposed, because of its location and construction, to cold air rising from the cavity bottom, steam rising from cold bread and heat of radiation from the heater and has thus been inherently unstable in operation and difficult to obtain a proper correlation with the primary thermomotive element, causing variations in operation of the heater switch. Being arranged immediately above the heater unit with a heat-shielding cover interposed therebetween, the compensatory thermomotive element of the inventive device is not directly exposed to any radiation and convection heat from the heater, and experiments show that it exhibits a stable rising temperature characteristic proportional to the temperature of the atmosphere in the bread-receiving cavity particularly in the vicinity of the surface of the bread slice placed therein.

It will be appreciated that the above-described conditions for satisfactory toaster operation can be fully satisfied by the inventive temperature control device owing to its construction and arrangement including the primary and compensatory thermomotive element and to its characteristic performances. In other words, by use of the inventive device, bread slices can be toasted successively to any desired brown color, light or dark, by freely adjusting the operational point of the heater switch assembly which acts under thermomotive action of the inventive device. As for variations in supply voltage, conventional devices of the type designed to sense the bread surface temperature have been deficient in that they can no longer open the heater switch exactly at the required operational point. In other words, as the voltage rises, the color to which bread slices are toasted grows lighter than is required, that is, the heater switch is opened the sooner. Contrariwise, as the voltage falls, the switch is opened the later and bread slices are toasted to darker colors.

Such undesirable performance characteristics can be avoided by the inventive thermostat device having the advantageous construction and arrangement described hereinbefore. If the supply voltage falls, the temperature of the heater element is considerably lowered as compared to that during normal operation and hence the temperature rise of the atmosphere is limited to considerably delay the rise in temperature of primary thermomotive element. Accordingly, with the case of conventional control devices, the primary thermomotive element arranged at a relatively low level is cooled by the cold air stream rising from the cavity bottom to such an extent that it cannot be deflected to any effective extent while the compensatory thermomotive element, being located relatively close to the heating element, is deflected to a considerable extent. Thus, the differential deflection between the two bimetal control members has been extremely limited and it has taken a considerably extended length of time to reach the point of operation. Moreover, the operation of the control device has often been unstable. In contrast to this, the primary thermomotive element of the inventive control device is caused to deflect to a sufficient extent under the effect of the convection heat even when the supply voltage and hence the ribbon temperature of the heater unit are lowered to reduce radiation heat threfrom. Moreover, the compensatory element can precisely follow the atmospheric temperature within the heat-shielding cover in proportion to the variation in voltage being applied to the heating element. Under these circumstances, it will be recognized that with the inventive device bread slices can be toasted even under reduced supply voltages to the same color as that under normal voltage condition.

Figure 12:
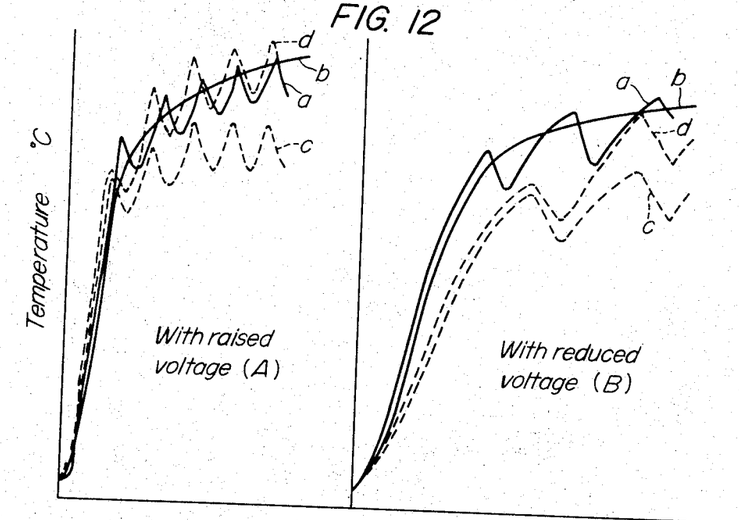
FIG. 12 illustrates the operating temperature characteristics of the inventive temperature control device when the supply voltage varies in comparison with those of the conventional device.
Figure 13:
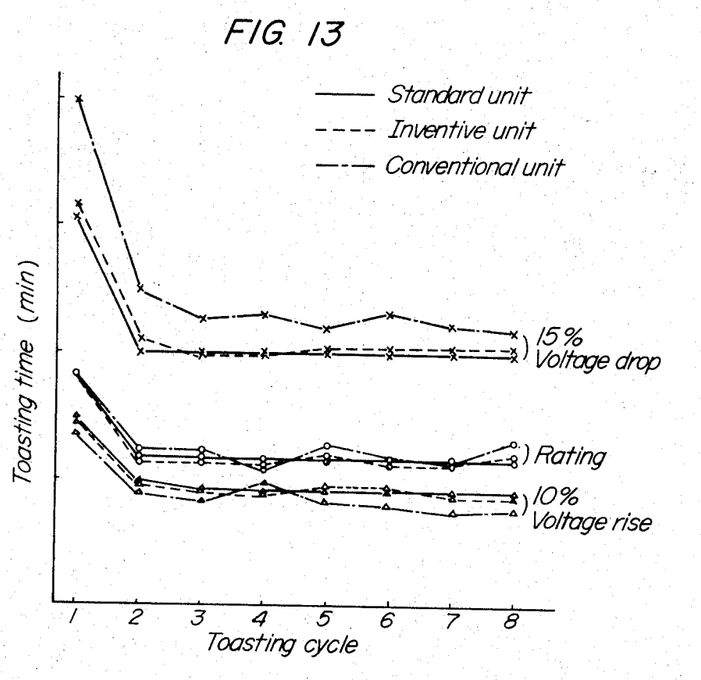
FIG. 13 illustrates the roasting-time characteristics of the inventive temperature control device when operated under different supply voltages in comparison with those of the conventional device.

Consideration will next be given to the manner in which the thermostat device operates with rise in supply voltage. In cases of conventional devices, the increment of radiation heat from the heating element resulting from the rise in supply voltage has been accommodated by the primary thermomotive element and such excess amount of heat cannot be completely compensated for by the compensatory element. This causes the heater switch to open prematurely before the required point of operation is reached and thus causes undertoasting. In contrast to this, in this case of the inventive device, the compensatory element operates effectively to receive any excess amount of heat due to the rise in supply voltage applied to the heating element with the aid of the elongated apertures formed in the heat-shielding cover and of the arrangement of the compensatory element at right angles to the fluid stream rising from the heater whereby any premature opening of the heater switch otherwise caused by the excessive deflection of the main control member can be effectively prevented. It has been found that by use of the inventive thermomotive device bread slices can be toasted successively to quite the same color as long as the rise or drop of the supply voltage is limited to 10% or 15%, respectively. FIGS. 12A and 12B graphically illustrate experimental data obtained with the inventive thermostat. FIG. 13 illustrates the manner in which the toasting time is varied with variation in supply voltage. As observed, the variation in toasting time of the inventive device is limited compared to that of the conventional device.

Consideration will next be given to the performances of the thermostat device when the room temperature varies to a substantial extent. With conventional devices, there has been a tendency that rise in room temperature causes darker toasting and fall in room temperature lighter toasting, that is, any variation in room temperature has had an influence similar to that of variation in supply voltage. This is a phenomenon caused by the fact that the balanced correlation between the primary and compensatory thermomotive members is disturbed by variation in room temperature as with the case of variation in supply voltage. Thus, if the room temperature falls, the primary thermomotive element is unduly cooled down and its stroke required to actuate the heater switch is extended. On the other hand, if the room temperature rises, the compensatory element, because of its arrangement and construction, cannot fully compensate for the excessive stroke of the main control member. This difficulty can be overcome by the inventive temperature control device since upon fall in room temperature any excessive cooling of the compensatory element is prevented while upon rise in room temperature the compensatory element can operate effectively in the same manner as described hereinbefore in connection with variation in supply voltage.

Description will next be made on the manner in which the inventive device satisfies the above-described fourth requirement that the reset time required before new bread slices are inserted should be as short as possible. One of the deficiencies involved in conventional control devices has been that they are not fully satisfactory in their functioning requiring a substantial length of time of 20 to 30 seconds or more to reset at the end of each toasting cycle. In general, to restart toasting operation the main control member must be cooled down to restore its normal position and, because of the rise in temperature of the atmosphere, the magnitude of deflection of the primary element must be extremely limited to enable it to restore its normal nondeflected position in a few seconds. In addition, in the case of conventional devices, the cooling of the primary thermomotive element is obstructed because of the simultaneous cooling of the compensatory element, requiring a considerable time for resetting. Also, various attempts have been made to expedite the cooling of the main control member. For example, use is made of a primary bimetal element which is extremely limited in width and has only a limited thermal capacity, or alternatively, the primary thermomotive element is positioned toward the bottom of the toaster so that it may be cooled at the end of each toasting cycle by cold air rising from the bottom. These devices, however, involve serious disadvantages. In the former device, the primary thermomotive element cannot have a satisfactory mechanical strength, lacks machinability and is necessarily expensive. In addition, it tends to cause misoperation even with a slight change in amount of heat to which it is subjected. In the latter device, the reduction in resetting time can be attained only at the sacrifice of other performances such as operating characteristics under varying supply voltage or room temperature and successive toasting cycles cannot be maintained uniform. After all, it has been found that any effective reduction in resetting time cannot be attained by such method.

According to the present invention, this problem is solved by mounting the primary and compensatory element in their respective specified positions. With the inventive device, though the extent to which the primary thermomotive element is cooled is substantially the same as with the case of conventional devices, the compensatory element, being located in an enclosed space (as indicated at 4 in FIG. 4), is effectively kept from being cooled. Because of this, the resetting is effected as soon as the primary thermomotive element is cooled to any slight extent. Experiments have shown that, in the atmosphere of 350° C. the resetting can be effected three to four seconds after and the toasting cycle can be repeated successively with uniform results. Thus, according to the present invention, the fourth requirement described above is also satisfied completely.

The fifth requirement for the toaster performance when bread slices are toasted discontinuously or at random intervals can also be met with the inventive thermomotive device as will be explained below. In general, bread slices must be toasted at all times to the same color as long as the primary and compensatory thermomotive element are perfectly correlated with each other. With conventional devices, however, the temperature correlation between the two elements is disturbed even with the slightest change in external factors including supply voltage, room temperature and resetting time. Among others, the resetting time is critically important to this toaster performance and it will be obvious that conventional devices have been unsatisfactory to meet this fifth requirement. With the inventive temperature control device, since the proportional correlation between the main and compensatory thermomotive element is perfectly maintained under the different operating conditions described hereinbefore, it will be understood that the toaster performance is kept uniform however irregular is the interval at which the toasting cycle is repeated.

It will now be appreciated that the inventive thermostat device exhibits performance characteristics completely satisfactory to the five necessary conditions mentioned hereinbefore.

An additional description will next be made on the significance of the junction between the primary and compensatory thermomotive element which forms the basis for the performances of the inventive thermomotive device, with particular reference to FIG. 2.

In the embodiment shown in FIG. 2, the junction between the two thermomotive members is flanged as at 6 to serve the purpose described below. In general, the hot stream flowing through the space between the central heating unit 10a and the surface of bread slice 19 includes, as shown in FIG. 4, a relatively cold flow M rising along the bread surface and a relatively hot flow K rising along the surface of heating element 10a. The primary bimetal thermomotive element 3 is operable primarily in response to the relatively cold flow M but, with its top portion positioned in the outlet of the relatively hot flow K, is liable to be influenced by the latter flow K. This involves the danger that the operation of the primary element be unduly accelerated leading to unsatisfactory results particularly in cases where small bread slices are toasted. To overcome this situation, the primary thermomotive element 3 shown in FIG. 2 is nondeflectingly formed at its top with a flange 6, which serves to preclude any unwanted effect upon the primary element of the hot stream and particularly of the flow K rising along the heater surface and also serves to shield the element when cooled, thus improving the reset characteristics of the device to a significant extent. The same effect can also be obtained by the bimetal units shown in FIGS. 6 and 7, as will readily be understood from the drawings and the description previously made with reference thereto.

Having shown and described the operation and its characteristics of the inventive thermostat device, brief description will next be made on one practical form of switching mechanism and one example of means for automatically bringing bread slices into toasting position in order to help understanding the toasting process effected under control of the inventive device, though the switching mechanism and the bread positioning means do not form any part of the present invention.

At first, it is to be noted that the inventive thermostat device can be employed with any form of switching assembly. The switch assembly illustrated in FIGS. 3 and 8 includes a toggle spring 38 as a contact strip designed directly to open and close the heater circuit contact strip 37. When the contact 37 and 38 are separated under the control of the deflecting control member 3, which acts upon the contact strip 37 through the intermediary of the push rod 23, the toaster heater 10 is deenergized to terminate the toasting process. The toasting process includes a sequence of operation stages, which will be described below in due order.

Figure 14:
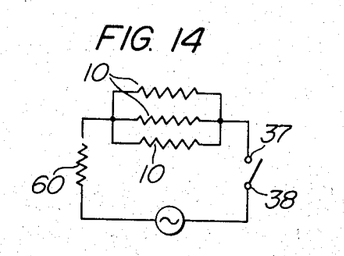
FIG. 14 illustrates the circuit arrangement of a toaster incorporating the inventive thermostatic device.

Referring to FIG. 8, when bread slices are placed on the bread supports 51a, 51b, one of the bread supports 51a is pivotally moved about its axis 67. As illustrated, a presser plate 68 is formed integral with the bread support 51a and, upon counterclockwise rotation of the support 51a, forces the switch contact strip 38 to the left, as viewed in FIG. 8, by way of a pusher arm 70 and a snap strip 69, which is connected with the contact strip 38. In this manner, the contact strip 38 is snapped to the left into contact with the other contact strip 37 to energize the toaster heater 10 and the tension wire 60 holding the bread supports in their upper position (see FIG. 14). As the result, the metal expansion wire 60 is extended allowing the amplifier lever arm 59 to rotate clockwise under the load on the bread supports, acting upon the lever arm 59 by way of crank lever 50a, pivotal connection 57 and leaf spring 58. At the same time, the crank lever 50a is pivoted about its fulcrum point 52 allowing the bread supports 51a and 51b to descend into toasting position thereby actually to start toasting. Subsequently, when the contact strip 37 is driven by the connecting link 23 to separate from the contact strip 38 under the control of the temperature control device, as described hereinbefore, the heater circuit is opened and the metal expansion wire 60 as well as the heater 10 are deenergized. The metal expansion 60 then starts to contact thereby to rotate the crank levers 50 in the direction opposite to that in which they are rotated to allow descent of the bread supports. In this manner, the bread supports are returned to their normal or nontoasting position, terminating the toasting cycle. In repeating such toasting cycle, the inventive thermomotive device in cooperation with the associated mechanisms makes it possible to toast bread slices successively at all times to the same color of the user's choice. It is to be understood that the inventive thermostat device is applicable to toasters of any type which includes a combination of a bread transferring device and a switch assembly and in which bread slices are held in vertical position. In addition to the advantageous performance characteristics described, the inventive thermostat device has different structural, economical and other features including simplicity in construction, limited use of bimetal material, stable operating points, limited cost and aptitude for mass production. Moreover, once built in a toaster, the device needs no further troublesome adjustments, the temperature in the toasting cavities being determined by the length and width of the primary and compensatory thermomotive element of the device. This enables manufacture of toasters upon the mass production basis with highly improved efficiency.

Though a few preferred embodiments of the present invention have been shown and described herein, it is to be understood that the invention is not to be restricted to the details set forth but many changes and modifications may be made without departing from the spirit and scope of the invention as defined in the appended claims.

What we claim is:

1. In combination with an electric toaster, a thermostat device comprising heating means vertically arranged in the toasting space of the toaster, support means for holding at least one bread slice between said heating means substantially parallel thereto, a primary bimetal element held suspended in a space between said heating means and the bread slice in a position relatively close to the top of said space and operable primarily in response to the surface temperature of the adjacent bread slice and the heat of steam rising therefrom, and a compensatory bimetal member arranged immediately over said heating means to detect the temperature of the atmosphere in the toasting space.

2. In combination with an electric toaster, a temperature control device comprising heating means vertically arranged in the toasting space of the toaster, support means for holding bread slices between said heating means substantially parallel thereto, a primary bimetal element held suspended in a space between said heating means and the bread slice in a position relatively close to the top of the space and operable primarily in response to the surface temperature of the bread slice and the heat of steam rising therefrom, a compensatory bimetal element arranged immediately over said heating means to shield the radiant heat from said heating means and detect part of the convection heat and operable in proportion to the temperature of the atmosphere in the toasting space, said device being operable in response to the differential deflection of said bimetal members.

3. In combination with an electric toaster, a temperature control device comprising heating means vertically arranged in the toasting space of the toaster, support means for holding at least one bread slice between said heating means substantially parallel thereto, a primary bimetal element arranged between said heating means and the bread slice and deflectable parallel to the surface of the bread slice, a switch mechanism for controlling said heating means and operably associated with the extremity of said primary bimetal element, heat-shielding cover means arranged immediately over said heating means in parallel to the top thereof and defining a predetermined air space, said heat-shielding cover means being formed in its side adjacent to said heating means with a slitted aperture so as to allow part of the convection heat to flow in said air space while precluding inflow of any radiant heat from said heating means, and a compensatory bimetal element horizontally arranged in said heat-shielding cover means and firmly fixed at one end in the toaster casing, said primary and compensatory bimetal elements being formed by bending the two respective legs of a U-shaped bimetal sheet so as to extend at right angles to each other, said primary bimetal element depending into the toasting space of the toaster to operate primarily in response to the temperature in the vicinity of the surface of the bread slice and said compensatory bimetal element being arranged in said heat-shielding cover means to operate in response to the temperature of the atmosphere in the toasting space of the toaster.

4. In combination with an electric toaster, a temperature control device comprising heating means vertically arranged in the toasting space of the toaster, support means for holding at least one bread slice between said heating means substantially parallel thereto, a primary bimetal element arranged in a space between said heating means and the bread slice in a position relatively close to the top of said space and extending substantially at right angles to the surface of the bread slice, a switch mechanism for controlling said heating means and operatively associated with the extremity of said primary bimetal element, heat-shielding cover means arranged immediately over said heating means substantially in parallel to the top thereof and defining a predetermined air space, said heat-shielding cover means being formed in its side facing said heating means with a slitted aperture so as to allow part of the convection heat to flow in said air space while precluding inflow of any radiant heat from said heating means, a compensatory bimetal element horizontally arranged in said heat-shielding cover means and firmly fixed at one end in the toaster casing, said primary and compensatory bimetal element being formed by bending the two respective legs of a U-shaped bimetal sheet so as to extend at right angles to each other with means provided to prevent deflection of said primary bimetal element along a portion of its length extending some distance from the bending point of said U-shaped bimetal sheet, and primary bimetal element being operable primarily in response to the temperature of the atmosphere in the vicinity of the top portion of the bread surface and said compensatory bimetal element being operable in response to the temperature of the atmosphere in the toasting space of the toaster.

5. In combination with an electric toaster, a temperature control device comprising heating means vertically arranged in the toasting space of the toaster, support means for holding at least one bread slice between said heating means substantially parallel thereto, a primary bimetal element arranged between said heating means and the bread slice so as to deflect substantially in parallel to the latter, a switch mechanism for controlling said heating means and operatively associated with the extremity of said primary bimetal member, heat-shielding cover means arranged immediately over said heating means in parallel to the top thereof and defining a predetermined air space, said heat-shielding cover means being formed in its side adjacent to said heating means with a slitted aperture to allow part of the convection heat to flow in said air space while shielding the radiant heat from said heating means, a compensatory bimetal element horizontally arranged in said heat-shielding cover means and firmly fixed at one end in the casing of the toaster, and a nondeflective metal member interconnecting said primary and compensatory bimetal elements in a manner so that the bimetal elements extend at right angles to each other, said primary bimetal element depending into the toasting space of the toaster to operate primarily in response to the temperature in the vicinity of the bread surface and said compensatory bimetal element being operable in response to the temperature of the atmosphere in the toasting space of the toaster.

6. An electric toaster including a temperature control device which comprises heating means vertically arranged in the toasting space of the toaster and including a central heater and side heaters arranged on opposite sides of said central heater in spaced parallel relation thereto, said central and side heaters being supported at opposite ends on the opposite end walls of said toasting space, a heat-shielding cover positioned immediately over said central heater to span the toasting space between the opposite end walls thereof, said heat-shielding cover being formed in its side adjacent to said heating means with a plurality of elongated apertures, a holder bracket fixed on one of the opposite end walls of the toasting space and carrying an arm extending into said heat-shielding cover, a compensatory bimetal member connected at one end to the extremity of said arm, said compensatory bimetal member and arm being held out of contact with said heat-shielding cover, a primary bimetal element connected to the other end of said compensatory bimetal element by means of a junction member extending through a window apertured in one side of said heat-shielding cover, said primary bimetal member extending from said junction member at right angles thereto to depend along the bread slice in closely spaced relation to the adjacent surface thereof, and a switch mechanism for controlling said heating means and operatively associated with the bottom extremity of said primary bimetal element.

References Cited
UNITED STATES PATENTS

| | | | |
|---|---|---|---|
| 2,077,627 | 4/1937 | Ireland | 99—328 |
| 2,099,210 | 11/1937 | Ireland | 99—329 |
| 2,356,649 | 8/1944 | Bucher | 99—328 |
| 2,667,115 | 1/1954 | Vogelsberg | 99—391 |
| 2,865,279 | 12/1958 | Palmer | 99—329 |
| 2,926,596 | 3/1960 | Anderson | 99—331 |
| 3,035,509 | 5/1962 | Lawser | 99—329 |

BILLY J. WILHITE, *Primary Examiner.*